United States Patent

[11] 3,576,481

| [72] | Inventor | Charles C. Rayburn |
| | | Falls Church, Va. |
| [21] | Appl. No. | 4,386 |
| [22] | Filed | Jan. 20, 1970 |
| [45] | Patented | Apr. 27, 1971 |
| [73] | Assignee | Illinois Tool Works, Inc. |
| | | Chicago, Ill. |

[54] MINIATURE METALIZED CAPACITOR AND METHOD AND APPARATUS FOR MAKING IT
9 Claims, 15 Drawing Figs.

| [52] | U.S. Cl. | 317/260 |
| [51] | Int. Cl. | H01g 3/21 |
| [50] | Field of Search | 317/260, 258; 174/113, 26, 27 |

[56] References Cited
UNITED STATES PATENTS

| 2,533,716 | 12/1950 | Coursey | 317/260 |
| 3,009,086 | 11/1961 | Rice et al. | 317/260 |
| 3,221,227 | 11/1965 | Devaney | 317/260X |
| 3,229,174 | 1/1966 | Marchewka | 317/260 |
| 3,283,225 | 11/1966 | Kalstein | 317/260X |
| 3,292,063 | 12/1966 | Kellerman | 317/260 |

*Primary Examiner*—Lewis H. Myers
*Assistant Examiner*—A. T. Grimley
*Attorneys*—Robert W. Beart, Michael Kovac, Barry L. Clark and Jack R. Halvorsen

ABSTRACT: Miniature capacitor is formed from a single strip of dielectric material metallized on each of its sides. The strip is wound generally from the middle of the completed capacitor using its lead wires as mandrels. The winding time is considerably shortened and a plurality of insulating thicknesses of strip material are quickly placed between the two lead wires by initially locating a central portion of the strip between the first lead wire and a retractable winding pin which orbits so as to carry the strip around the first lead wire in the form of a loop which is wound into the capacitor after the second lead wire has been inserted. The winding pin is mounted adjacent an elongated slot. The first lead wire may be loaded in an axial direction at one end of the slot and carried to the other end of the slot by the looped strip as the strip is carried around the lead wire by the orbiting of the winding pin and slot. The second lead wire may then be fed into the slot along the same axis as the first lead wire was fed, and the winding pin retracted, without any interruption in the winding. The leads are retained in the capacitor by heat shrinking the dielectric strip.

Patented April 27, 1971

INVENTOR.
Charles C. Rayburn
BY Barry L. Clark
Robert W. Heart
His Att'ys

Patented April 27, 1971

INVENTOR.
Charles C. Rayburn
BY Barry L Clark
Robert W. Beart
His Att'ys

MINIATURE METALIZED CAPACITOR AND METHOD AND APPARATUS FOR MAKING IT

BACKGROUND OF THE INVENTION

This invention relates to wound capacitors and particularly to an improved metallized capacitor and a method and apparatus for manufacturing it.

Capacitors folded on a line at their center and wound or wrapped from their centers about a mandrel, are known in the prior art as exemplified by U.S. Pat. Nos. 2,887,649 and 2,920,834. In each of these patents, the metallized coatings on the opposite sides of the dielectric strip are offset in a transverse direction so that leads may be attached to the ends of the capacitor. Although there are many instances in the prior art where it has been proposed to use the lead wires as at least one of the winding mandrels, such devices generally require secondary operations. For example, in U.S. Pat. No. 3,229,174 and German Pat. No. 886,634, the lead members must be attached by adhesive or welding to an electrode foil before winding. In U.S. Pat. No. 2,790,607, the winding takes place generally about a pair of wires but the wires are attached to the two separate metallized strips forming the capacitor by means of a thermoplastic adhesive and are, in the principal embodiment of the invention, designed to be removed after winding. Although the last-named patent contemplates the possibility of leaving one of the wires in the capacitor for use as a lead wire, it is not possible to use both of the wires in this manner.

SUMMARY

It is an object of this invention to provide a wound metallized capacitor which may be made in a smaller size then presently available, and which will: have self-healing properties; have rigid, standup leads which render it suitable for use in printed circuit boards; eliminate the presence of air in the electric field; and be manufacturable to extremely close tolerances over a large range of values extending generally from 100 pf. to 0.01 mfd.

It is another object of this invention to provide a method of winding a metallized capacitor with a fewer number of turns than would be necessary by using conventional devices which wind from the center of the capacitor.

It is yet another object of the invention to provide a method of winding which requires only a very simple and economical winding apparatus and one in which the winding can continue without interruption even while the second lead wire is being fed into position within the capacitor.

A still further object of the invention is to provide a winding apparatus wherein only a single supply roll of metallized dielectric and a single spool of lead wire is required.

These objects are obtained by the capacitor, method and apparatus of the present invention wherein the capacitor is formed by winding a single strip of two-side metallized dielectric material about two straight wires which act as mandrels but remain in place to function as lead wire connections. The strip of metallized dielectric material has unmetallized margins on each edge of both sides and, in a preferred embodiment of assembly apparatus, is wound initially with a portion intermediate its ends positioned between a first lead wire and a retractable pin which is spaced from the first lead wire and of a greater diameter. The second lead wire is inserted and the retractable pin is withdrawn after a predetermined number of winding revolutions have taken place. During the initial revolutions the retractable pin orbits around the first lead wire together with a loop of strip material which it forms. Since the pin and first lead wire are spaced from each other, the capacitor will initially be wound at a large effective diameter. Because of the loop, four thicknesses of material will be wound at one time. It can thus be readily appreciated that the capacitor will be wound quickly and with relatively few turns as compared to conventional capacitors. After the retractable pin has orbited so as to carry the loop of strip material around the first lead wire at least once, the second lead wire is inserted so as to contact the side of the metallized strip which is opposite to that contacted by the first lead wire. Following the insertion of the second lead wire, the retractable pin is withdrawn, the winding of the capacitor is completed, the strip is cut from its supply reel, and the ends of the strip are taped or otherwise sealed to hold the layers together. In an alternative embodiment, an intermediate portion of the strip is initially folded back on itself twice in zigzag fashion to form a three thickness portion which is then engaged on its opposite sides by a pair of lead wires. The strip is then wound using the lead wires as mandrels.

The improved method of winding causes a central portion of the dielectric strip to be folded at least twice and doubled back on itself, resulting in several layers of dielectric separating the leads of the capacitor and protecting them against arcing inside the winding. At the points where the leads egress from each end of the winding, they are spread apart after the winding is completed and the ends of the capacitor are sealed and filled with an insulation material such as epoxy resin in order to prevent arcing in that region, insulate the ends, lock the leads against translation or rotation, and protect the unit against the entry of moisture. It will be appreciated that the finished capacitor will be extremely compact since it does not contain the usual voids produced by removable winding mandrels. Since the leads are internally mounted, they are firmly anchored and offer good electrical contact since the metallized layers contact the major portion of their periphery.

Since the winding process causes a pair of lead wires to extend from each end of the capacitor, it is possible to selectively cut and form the lead wires so as to produce either axial, radial, or standup lead arrangements, although the structure is probably most useful in the standup style which is adapted to be mounted in printed circuit boards.

BRIEF DESCRIPTION OF THE DRAWINGS

FIG. 14 is a transverse cross-sectional view of a capacitor made in accordance with the invention.

DESCRIPTION OF THE PREFERRED EMBODIMENTS

Figure 1A:
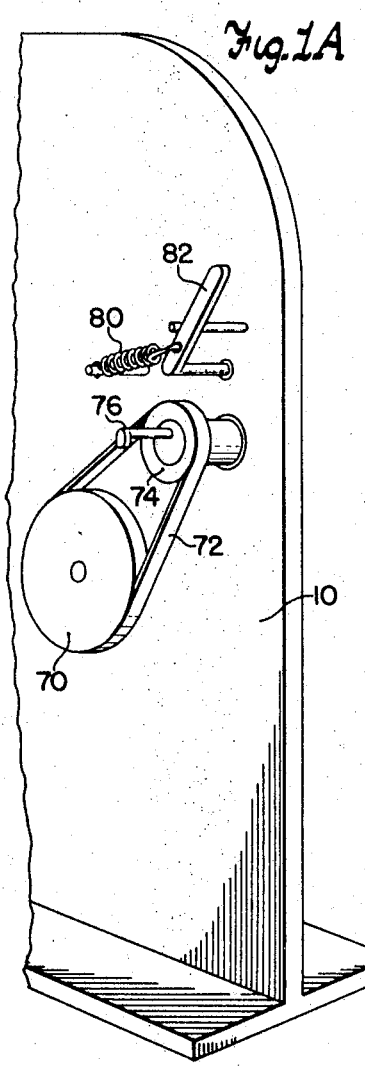
FIG. 1A is a front perspective schematic view of a simplified hand-operated winding apparatus for winding capacitors in accordance with the process of the invention.
Figure 1B:
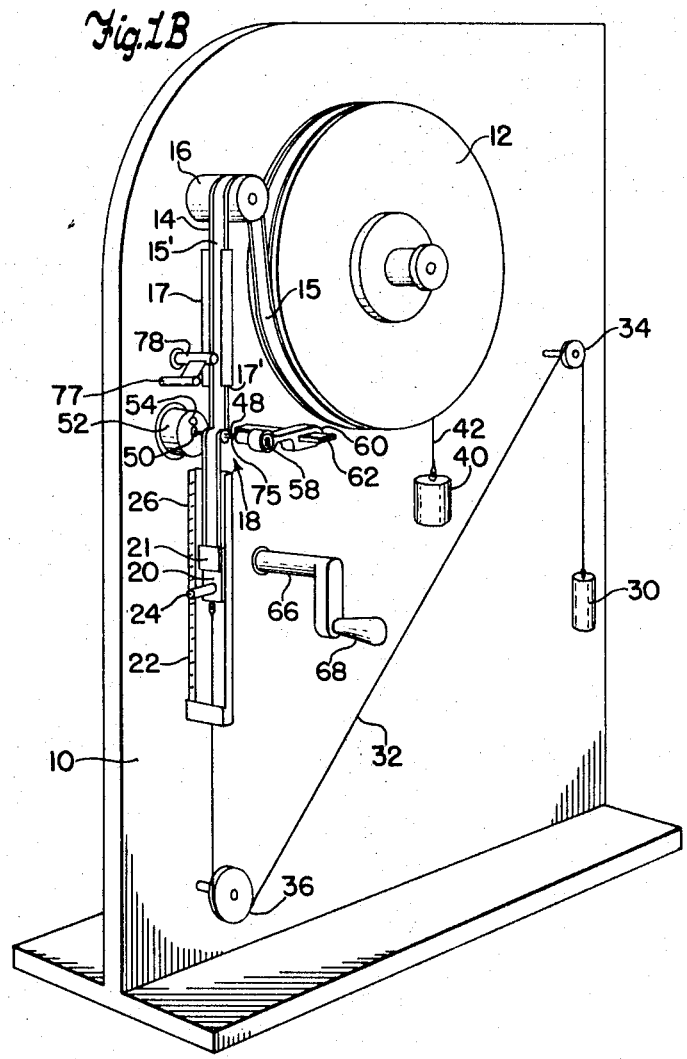
FIG. 1B is a fragmentary rear perspective schematic view of the device shown in FIG. 1A.
Figure 2:
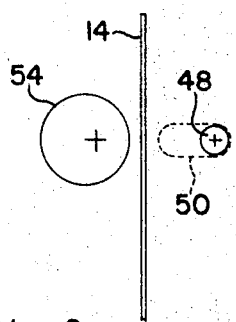
FIGS. 2—8 are schematic diagrams illustrating the relationships between the dielectric strip, the lead wires, and the retractable winding pin at various stages during the winding of a capacitor.

In FIGS. 1A and 1B, a simple hand-operated apparatus for winding the capacitor of the invention is shown. The apparatus includes a frame 10 supporting a supply reel 12 of heat shrinkable dielectric material such as polyester or polypropylene film coated on each of its first and second sides with metallized coatings 15 and 15' which form the two electrodes of the finished capacitor. The coatings 15, 15' are spaced from each of the strip edges by unmetallized margin regions. The dielectric strip 14 passes from the supply reel 12 over a guide roller 16, along a feed chute 17 and through a winding station indicated generally at 18 to a takeup block 20 to which it is attached during winding by a piece of adhesive tape 21. The takeup block 20 is mounted for reciprocating movement within takeup guide chute 22 and is manually movable by handle 24. A series of scale markings 26 are provided on the takeup guide chute 22 so that the takeup of block 20 can be moved, by means of its handle 24, to any desired predetermined position on the scale depending on the value of the capacitor being wound. Once the takeup block 20 is attached to the dielectric strip 14 by the adhesive tape 21, it will remain in said predetermined position until winding commences if the tensions in the supply and takeup portions of the apparatus are properly balanced. The takeup tension is controlled by varying the size of tension weight 30 which is attached to the takeup block 20 by means of a cord 32 passing over pulleys 34, 36. The tension on the supply reel is controlled by adjusting the size of weight 40 acting on the cord 42 which passes over a hub or shoulder (not shown) on the back of supply reel 12 to cause a braking or dragging action on the supply reel 12. The various tensions can be readily adjusted and matched to each other so that strip 14 will remain stationary when at rest by removing or adding weights in accordance with the type of strip material used, the winding tension desired, and the amount of material on the supply reel 12.

Prior to winding the strip 14 to form a capacitor, a first lead wire member 48 is inserted with its inner end in an elongated slot 50 in a winding head 52. The outer end of the lead wire 48 is supported in an outboard lead support 58 which is freely mounted for rotation on a lead support slide 60 which is in turn mounted for in and out movement relative to the frame plate 10 on a guide rail 62.

Figure 3:
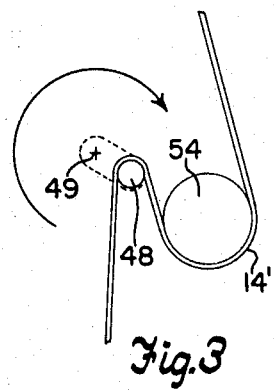
Figure 4:
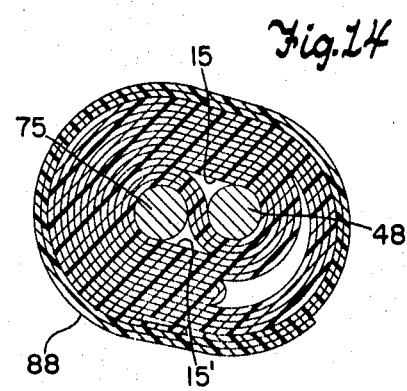
Figure 4:
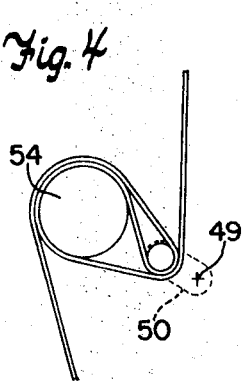
Figure 5:
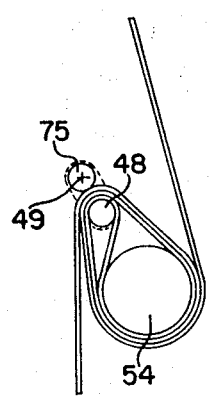
Figure 6:
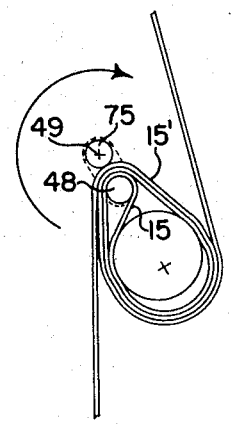

Once the first lead wire 48 is placed in slot 50 and support 58 and next to the strip 14, the drive shaft 66 may be rotated by handle 68 to cause rotation of the pulley 70, the belt 72, the pulley 74, and thus the winding head 52. Rotation of the winding head 52 in a clockwise direction about its center of rotation 49 will cause a winding pin 54 thereon having a diameter larger than the lead wires to carry the strip 14 in a loop 14' around the first lead wire 48 as shown in FIG. 3. After one rotation, the strip will assume the configuration shown in FIG. 4 wherein it can be seen that the first lead wire 48 has been pulled sideways to the end of slot 50 which is opposite to the center of rotation 49. Continued rotation of the winding head 52 one-half or more turns to the relative position shown in FIG. 5 will permit the second lead wire 75 to be inserted on the same axis 49 on which first lead wire 48 was originally placed. Since both lead wires are fed along the same axis, they can be cut from the same supply reel (not shown) or fed as short lengths. Inserting the second lead wire 75 in the middle of a revolution of the winding head 52 as shown in FIG. 5 will permit it to contact the second side metallized surface 15'. After the second lead wire 75 has been inserted, the winding pin 54 (see FIG. 6) may be rotated on its own shaft 76 in winding head 52 so winding pin 54 will move closer to slot 50. This movement is permitted by the fact that the winding pin 54 is eccentrically mounted. Rotation of eccentric shaft 76 so as to move winding pin 54 closer to the slot 50 will also move it out of contact with the loop 14' which it had formed in the strip 14. In this position where it is out of contact with the loop, the eccentric shaft can be axially retracted so as to withdraw the winding pin 54 and prevent its further contact with the strip 14. Once the winding pin 54 is retracted, continued rotation of the winding head 52 will cause the loop 14' to be wound into the body of the capacitor as seen in FIGS. 7 and 8.

Figure 7:
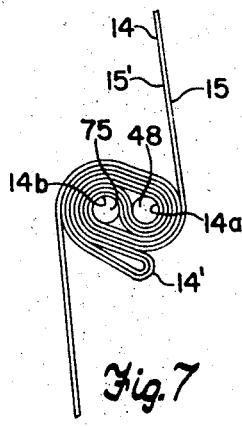
Figure 8:
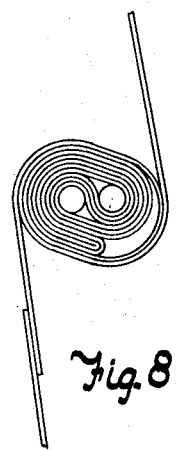

It can be seen in FIG. 7 that lead 48 will contact metallized surface 15 along a first intermediate portion 14a on the strip 14 and that lead 75 will contact surface 15' along a second intermediate portion 14b on the strip which is spaced from portion 14a by a distance greater than twice the circumference of lead 48. This spacing insures that the leads are well insulated against shorts and also reduces the opportunity for damage to the dielectric strip 14 when soldering heat is applied to the leads 48, 75 of a finished capacitor since the heat may be dissipated over a large area.

When winding has proceeded to the point wherein takeup block 20 has been lifted by the strip 14 and adhesive tape 21 to the top of guide chute 22, the winding is stopped. At this time, a clamp 77 on a shaft 78 is rotated into clamping engagement with strip 14 and a razor blade or other cutting device used to sever the strip 14 at the lower edge 17' of the feed chute 17. The clamp 77 is normally biased by a spring 80 away from the feed chute, but may be held against the strip 14 by means of the handle 82.

After the strip 14 is severed at the lower edge 17' of the feed chute and the adhesive tape 21 removed from the takeup block 20, the capacitor is rotated until the adhesive tape 21 has been pressed around the outside of the capacitor to hold its wraps together.

After the capacitor is wound and sealed by tape 21, it may be removed from the winding station 18 by sliding lead support slide 60 on guide rail 62 sufficiently far so as to release outboard lead support 58 from contact with the first and second lead wires 48 and 75. The capacitor is then withdrawn from slot 50.

Figure 9:
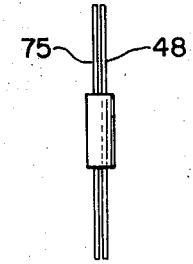
FIG. 9 is a plan view of a capacitor showing the relationship of the lead wires to each other immediately after winding.
Figure 10:
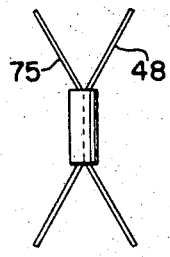
FIG. 10 is a view similar to FIG. 9 showing the lead wires after they are spread apart from each other.
Figure 11:
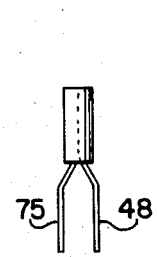
FIG. 11 illustrates the capacitor of FIG. 10 after the leads at one end have been cut off and the leads at the other end have been formed.
Figure 12:
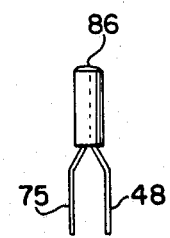
FIG. 12 is a view similar to FIG. 11 but wherein an insulating coating has been applied to the ends of the wound strip.

In FIG. 9 the capacitor and its leads are shown in the relative positions they assume after the winding operation. FIG. 10 illustrates how the pairs of lead wires can be bent away from each other while FIG. 11 shows that the leads which have already been bent can be clipped at one end and formed at the other in such a manner that the capacitor can be utilized in a printed circuit board. If desired, by clipping appropriate leads, the capacitor could also be formed so as to have axial leads or radial leads. As seen in FIG. 12, the capacitor 12 can be insulated and sealed by injecting a filler material 86 such as epoxy resin in the ends thereof. This filler material not only seals the capacitor against moisture but also locks the leads firmly and prevents relative rotation of them and shorting.

Figure 13:
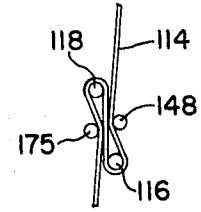
FIG. 13 is a schematic diagram of a modified form of winding apparatus.

FIG. 13 illustrates an alternative embodiment of the invention wherein a strip of dielectric material metallized on both sides may be placed in a zigzag doubled back fashion around a pair of loop forming pins 116, 118. A pair of first and second lead wire members 148 and 175 are then brought into contact with the opposite sides of the strip and the pins 116, 118 withdrawn. The capacitor is then wound by utilizing the lead wire members 148, 175 as winding mandrels.

FIG. 14 illustrates the cross section of a finished capacitor 88 wherein the dielectric film has been heated to shrink it after bending the leads to the position shown in FIG. 10

I claim:

1. In a wound capacitor a length of dielectric strip having first and second metallized coatings on its respective first and second sides,
    a first lead wire;
    a first intermediate portion of said dielectric strip being in partially encircling electrical contact on its first side with less than the entire circumference of an axially extended portion of said first lead wire;
    said dielectric strip being folded back on itself so as to provide a second intermediate portion of said dielectric strip in electrical contact on its second side with the second side of said first intermediate portion;
    said first and second intermediate portions being spaced from each other along the length of said dielectric strip by a distance in excess of twice the circumference of said first lead wire;
    a second lead wire being in partially encircling contact along an axial portion thereof which is less than its entire circumference with a portion of the second side of said dielectric strip; and
    means for retaining the opposite ends of said dielectric strip in contact with each other and with the previously wound portions of said capacitor to prevent unwinding thereof.

2. A wound capacitor as defined in claim 1 wherein said first and second lead wires are spaced from each other internally of said capacitor by at least three layers of said dielectric strip.

3. In a wound capacitor;
    a single length of dielectric strip having metallized coatings on opposite sides thereof and being convolutely wound generally from its central region outwardly to its ends;

first and second lead wires in engagement with first and second sides of said strip and having parallel portions extending axially at least substantially through said capacitor, said parallel portions being spaced from contact with each other by at least one layer of said dielectric strip;

said dielectric strip being generally folded along at least two lines in the central region thereof which are transverse to the length of said strip and spaced from each other along said strip by a distance greater than the combined diameters of said lead wires; and said folding of said strip at two places permitting the material of said strip to be fully wound with a fewer number of turns than would be required if the strip were wound from one end or from a single fold at its center.

4. A wound capacitor as defined in claim 3 wherein said parallel portions are spaced from each other by at least three layers of said dielectric strip.

5. A wound capacitor as defined in claim 4 wherein said strip is twice doubled back on itself at its center in zigzag fashion by being folded along said two lines, said first and second lead wires being in contact with the metallized coatings on the opposite sides of the strip in said doubled back region and spaced from each other by the three layers of said strip forming the doubled back region.

6. A wound capacitor as defined in claim 3, wherein said first side of said strip is partially wrapped around and in contact with said first lead wire on said first fold line and said second fold line is spaced along said strip from said first fold line sufficiently far so as to be separated from each of said lead wires in a direction radially thereof by at least three layers of dielectric.

7. A wound capacitor as defined in claim 3, wherein said ends of said dielectric strip are attached to each other and to the body of the capacitor, said dielectric strip being heat shrunk into firm engagement with said lead wires to prevent their withdrawal from said capacitor.

8. A wound capacitor as defined in claim 7, wherein said first and second lead wires extend outwardly from one end of said capacitor in diverging directions.

9. A wound capacitor as defined in claim 8, wherein the side edges of said dielectric strip are devoid of said metallic coating and covered by a protective coating.